(12) United States Patent
Kori (10) Patent No.: US 12,440,438 B2
(45) Date of Patent: Oct. 14, 2025

(54) METHOD OF REMOTELY CONTROLLING PAIN

(71) Applicant: Novilla Pharmaceuticals, Inc., Arlington, VA (US)

(72) Inventor: Shashidhar H. Kori, Clover, SC (US)

(73) Assignee: NOVILLA PHARMACEUTICALS, INC., Arlington, VA (US)

( * ) Notice: Subject to any disclaimer, the term of this patent is extended or adjusted under 35 U.S.C. 154(b) by 0 days.

(21) Appl. No.: 16/934,526

(22) Filed: Jul. 21, 2020

(65) Prior Publication Data

US 2021/0022993 A1 Jan. 28, 2021

Related U.S. Application Data

(60) Provisional application No. 62/902,566, filed on Sep. 19, 2019, provisional application No. 62/877,041, filed on Jul. 22, 2019.

(51) Int. Cl.
*A61K 9/00* (2006.01)
*A61K 9/06* (2006.01)
*A61K 31/407* (2006.01)

(52) U.S. Cl.
CPC ............. *A61K 9/0014* (2013.01); *A61K 9/06* (2013.01); *A61K 31/407* (2013.01)

(58) Field of Classification Search
CPC .................................................. A61K 9/0014
See application file for complete search history.

(56) References Cited

U.S. PATENT DOCUMENTS

| 2006/0216339 A1* | 9/2006 | Ambron | A61K 38/10 |
| | | | 424/449 |
| 2010/0184817 A1 | 7/2010 | Wolicki | |
| 2013/0209585 A1* | 8/2013 | Kim | A61K 47/44 |
| 2014/0037718 A1 | 2/2014 | Lutz | |
| 2015/0258196 A1* | 9/2015 | Fossel | A61K 47/02 |

FOREIGN PATENT DOCUMENTS

| JP | 2010195713 A * | 10/2014 | ........... A61K 31/407 |
| WO | 2012/082525 A2 | 6/2012 | |
| WO | WO2013/067591 A1 * | 5/2013 | ............... A61K 9/06 |
| WO | 2016/141056 A1 | 9/2016 | |

OTHER PUBLICATIONS

Hwan Lee, An Imager's Guide to Perineural Tumor Spread in Head and Neck Cancers: Radiologic Footprints on 18F-FDG PET, with CT and MRI Correlates, Journal of Nuclear Medicine Mar. 2019, 60 (3) 304-311 (Year: 2019).*

Perineural analgesia, Medical Dictionary. (2009). Retrieved Dec. 30, 2020 (Year: 2020).*

Jacob D. Brown, CT-guided injection of a TRPV1 agonist around dorsal root ganglia decreases pain transmission in swine, Sci Transl Med. Sep. 16, 2015; 7(305): 305ra145 (Year: 2015).*

JP2010195713A, Google English translation, downloaded in Dec. 2020 (Year: 2020).*

Apothecary Options, Topical Pain Creams for Management of Acute, Chronic, and Neuropathic Pain, publication date: Mar. 2018, evidence of date provided in a subsequent document (Year: 2018).*

Apothecary Options, date evidence (Year: 2018).*

International Search Report and Written Opinion of the International Searching Authority dated Oct. 22, 2020 issued in corresponding International Application No. PCT/US2020/042872 (16 pgs.).

Pegah Safaeian et al., "Novel Treatment of Radicular Pain With a Multi-Mechanistic Combination Topical Agent: A Case Series and Literature Review", Anesth. Pain Med. Apr. 2016, 6(2):e33322, 8 pgs.

Zhi-Jiang Huang et al., "Topical Application of Compound Ibuprofen Suppresses Pain by Inhibiting Sensory Neuron Hyperexcitablity and Neuroinflammation in a Rat Model of Intervertebral Foramen Inflammation", The Journal of Pain, vol. 12, No. 1, Jan. 2011, pp. 141-152.

Anonymous: "Topical Pain Creams for Management of Acute, Chronic, and Neuropathic Pain", Jul. 18, 2009, Apothecary Options, www.apothecaryoptions.com, 13 pgs.

L. Matthews: "Using Topical Analgesics for Back Pain Relief", Non-Surgical Treatments, Pain Relief Devices, Uncategorized, Apr. 26, 2014, URL:https://stenosisspinal.org/blog/topical-analgesics-pain-relief/ 8 pgs.

Anonymous: "Prescription Order Form Low Back Pain Cream Formula with Gabapentin, Ketamine, Ketoprofen, Piroxicam, Baclofen, Cyclobenzaprine", Jul. 18, 2009, URL:https://web.archive.org/web/20090718161143if_/http://www.apothecaryoptions.com:80/pdf/ChronicLowBackPainRX.pdf 1 pg.

NA Shostak et al., "A Randomized Clinical Study of Topical Ketorolac Tromethamine Gel and Topical Ketoprofen Gel in Patients with Knee Osteoarthritis or Low Back Pain", EC Orthopaedics, vol. 9, No. 4, Mar. 23, 2018, 8 pgs.

International Preliminary Report on Patentability dated Jan. 26, 2022, issued in corresponding International Patent Application No. PCT/US2020/042872 (9 pgs.).

* cited by examiner

*Primary Examiner* — Mark V Stevens
*Assistant Examiner* — Alparslan Asan
(74) *Attorney, Agent, or Firm* — Pillsbury Winthrop Shaw Pittman, LLP (57) ABSTRACT

Disclosed are methods for a novel, counter-intuitive, non-obvious, non-invasive, simple to administer, non-systemic delivery of analgesics through the skin to the DRG and DH area to block and relieve pain in the dermatomal distribution of that particular DRG. This method of pain control provides a non-addictive, inexpensive, simple to use alternative to the present standard of care involving addictive, potentially dangerous opioid therapy.

6 Claims, 4 Drawing Sheets

METHOD OF REMOTELY CONTROLLING PAIN

CROSS-REFERENCE TO RELATED APPLICATIONS

This application claims priority to U.S. Provisional Patent Application No. 62/902,566, filed Sep. 19, 2019 and U.S. Provisional Patent Application No. 62/877,041 filed Jul. 22, 2019, the contents of each of which is hereby incorporated by reference in its entirety.

BACKGROUND

1. Field of the Embodiments

The embodiments described herein relate to the relief of pain in any area of the body by delivering analgesics to the Dorsal Root Ganglion (DRG) and Dorsal Horn (DH) of the spine that dermatomally process the nociceptive stimuli from the area of pain.

2. Description of Related Art

Pain is the most common symptom that brings a patient to his/her physician, and the most common symptom from which a patient requests relief. Medications that relieve pain can be classified into three major categories:
  a. Opioid Analgesics;
  b. Non-opioid analgesics; and
  c. Anesthetics Opioid Analgesics:

These are the most commonly prescribed pain medications used to treat moderate to severe pain conditions. They are very effective in controlling pain, show consistent efficacy, are easy to administer and are inexpensive. However they are also associated with significant disadvantages. Serious clinical adverse events include nausea and vomiting, severe constipation, sedation, impaired driving, impaired cognition, itching, respiratory depression/suppression and death. Even more worrisome concerns are related to their potential for psychological dependence, addiction and withdrawal reactions. Opioid dependence is now a well-recognized national crisis. In 2017 opioids were responsible for 62,000+deaths, 6 times more than in 1999. This increase in opioid related deaths has affected both men and women of all races and all ages. In the United States, opioid prescriptions quadrupled from 1999 to 2014, even though the number of pain patients remained the same. One out of 5 patients with a diagnosis of non-cancer pain is prescribed an opioid for more than a month by office-based practices. 45 Million patients are prescribed opioids every year after surgical procedures. Most people who abuse opioids get them for free from a friend or relative who has been prescribed an opioid. US Congress has recognized this problem as an epidemic, and the biggest threat to public health since the HIV epidemic.

Non-Opioid Analgesics:

There are very limited selection of non-opioid analgesics. They belong to two major categories, Non-Steroidal Anti-Inflammatory Drugs (NSAID) or simple analgesics. Simple analgesics like acetaminophen are useful in treating only mild to moderate pain and their excessive use can cause hepatic damage. NSAIDs are very effective analgesics, especially when the pain is also associated with local inflammation, there are a wide selection of many different individual drugs, they can be administered by a variety of different routes like tablets, IM injections, SC injections, intranasal spray, eye drops etc, and they are inexpensive and even available without a prescription. As their method/site of action is both peripheral and central, however, they are now being administered systemically and their actions depend on distribution of the drug through blood circulation, which leads to many sensitive organs in the body also being exposed to the drugs. Serious adverse events that have resulted because of such systemic exposure to these drugs include gastric ulcer, bleeding from gastric ulcer, other GI bleeds, bleeding at the site of injury/damage, bleeding at other sites, renal insufficiency, platelet dysfunction and even cardiovascular injury. These side effects are especially pronounced in elderly patients population, and is considered a major health care concern. As a result, the use of one of the most effective NSAID, Ketorolac, is limited to no more than 5 days of use. Varying levels of restrictions of use in terms of dose, duration and age also are placed on many NSAIDs.

Anesthetics:

There are two major categories of anesthetics, General and Local. General anesthetics are used to impair consciousness and are not relevant to pain control. Local anesthetics can be injected at the site of pain to remove all sensations at the site, or can be injected away from the site of the pain, around a nerve that carries sensation from the affected area, by performing a nerve block. Nerve blocks control pain very effectively when performed well by an experienced and expert professional. But they are invasive, need insertion of a needle or a catheter, have to be performed by specially trained professionals, are short lasting and hence need to be repeated frequently, making them impractical and expensive to be applied for routine pain management. In addition, anesthetics not only take away pain, but also take away all sensations, leaving the affected area numb. Many patients complain that such numbness is almost as distressing as the original pain.

Figure 1:
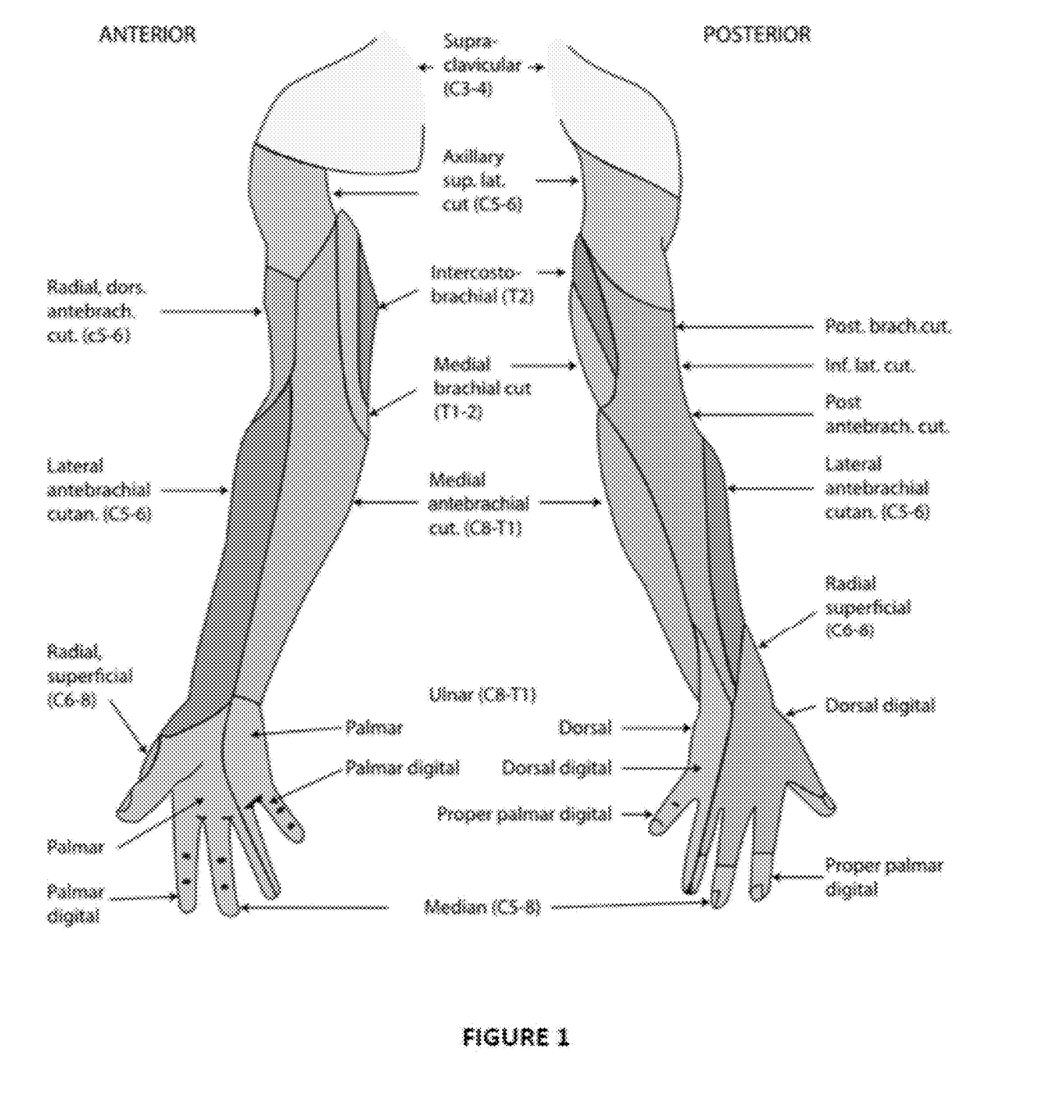
FIG. 1 illustrates the dermatomes associated with the upper extremities and their associated DRGs.
Figure 2:
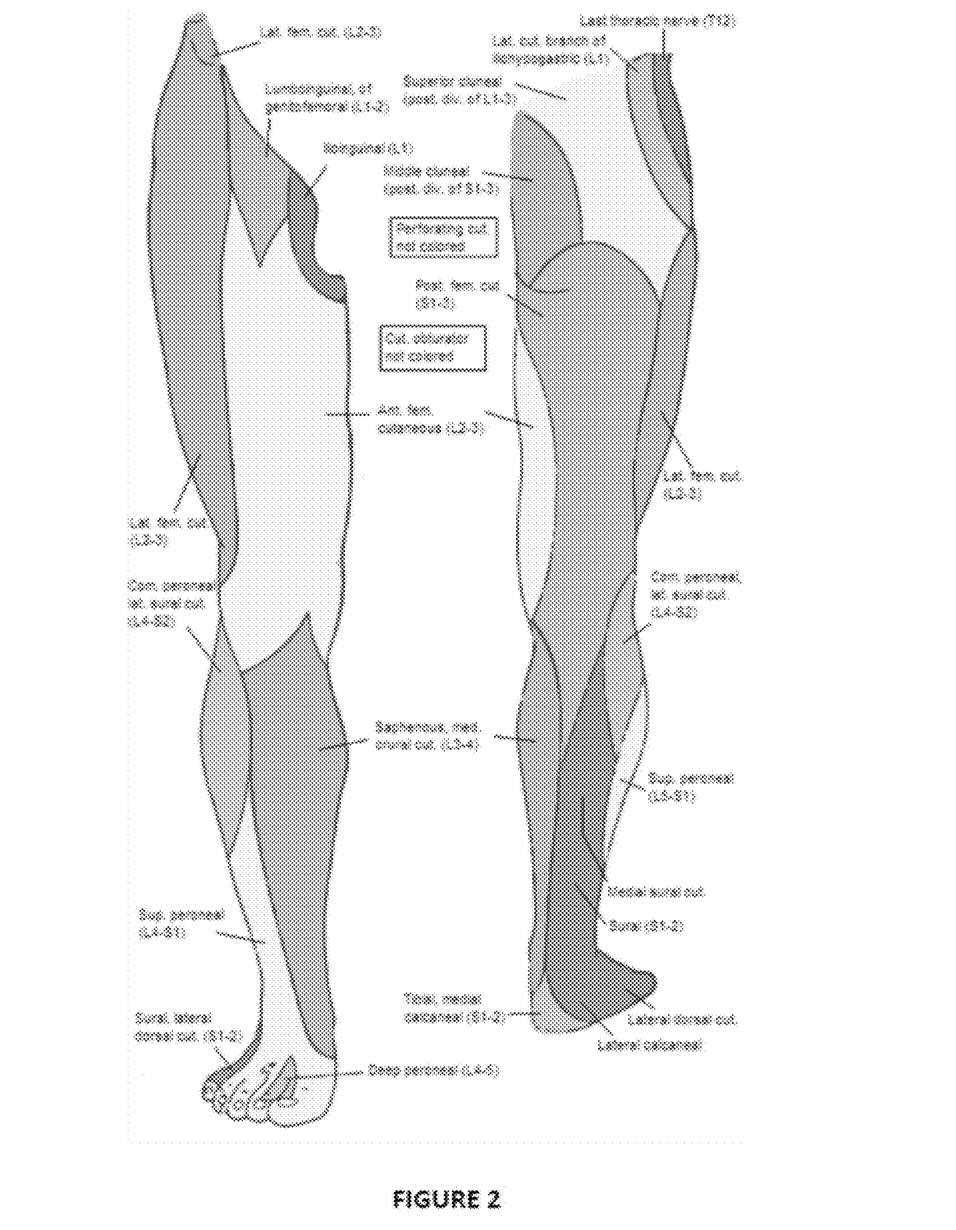
FIG. 2 illustrates the dermatomes associated with the lower extremities and their associated DRGs.

In humans there are 31 pairs of ganglion: 8 cervical, 12 thoracic, 5 lumbar, 5 sacral, and 1 coccygeal. Each pair connects the spinal cord with a specific region of the body called a dermatome. Near the spinal cord each spinal nerve branches into two roots. One, composed of sensory fibers, enters the spinal cord via the dorsal root; its cell bodies lie in a spinal ganglion that is outside the spinal cord. This is called the Dorsal Root Ganglion (DRG). The other, composed of motor fibers, leaves the spinal cord via the ventral root; its cell bodies lie in specific areas of the spinal cord itself. Individual DRGs, and sometimes one or more adjacent DRGs, correspond to a specific dermatome. For example, as shown in FIG. 1, the pinky finger and outer portion of the arm is a dermatome whose nerve fibers are supplied by the DRG located at the $8^{th}$ Cervical Nerve (or C8). As shown in FIG. 2, a number of a person's toes are present in a dermatome whose nerve fibers are supplied by the DRG(s) as S1-2.

The 30 dermatomes are numbered according to the corresponding spinal vertebral levels originate, for example, The 7 cervical dermatomes (C2-C8, as C1 nerve has no dermatome). The "C" stands for cervical, which means having to do with any part of the neck, including the neck on which the head is perched, and the neck of the shoulders.
  C2—Head and neck
  C3—Head and neck
  C4—Neck
  C5—Neck
  C6—Thumb
  C7—Middle finger
  C8—Little finger 12 thoracic dermatomes (T1-T12)—"T" refers to the thoracic, or to the upper torso area of the body or chest (frontal and dorsal).

T1—Inner forearm
T2—Upper inner arm
T3—Middle of the back (dorsal)
T4—Level of the nipples
T5—Chest/rib area
T6—Chest/rib area.
T7—Upper section between the xiphoid process and the belly button
T8—Halfway down from the level of the xiphoid process to the level of the belly button
T9—From the middle section of the xiphoid process to the belly button.
T10—Level of the belly button (umbilicus)
T11—Between the level of the belly button and the groin (inguinal ligament)
T12—The midpoint of the groin 5 lumbar dermatomes (L1-L5) that supply sensation from these spinal nerves in the lower limb (leg, foot, hip, etc.)—"L" refers to the five lumbar vertebrae, the disks below them, and the corresponding area of the lower back.

L1—The hip and groin area
L2—The inside of the thigh
L3—Knee
L4—The inside part of the ankle bone (medial malleolus)
L5—Bottom of the foot and toes 1-3

5 sacral dermatomes (S1-5)—"S" refers to the sacral or the sacrum, which are located below L5.

S1—Toes and 4 and 5, and the outside part of the ankle bone (lateral malleolus)
S2—The outer side (lateral portion) of the heel bone (calcaneous)
S3—The middle portion of the buttocks, perianal area, penis, and scrotum
S4—The skin over the perianal area (in addition to S5); perianal areas, and genitals
S5—The skin over the perianal region (along with S4) and the skin immediately at and next to the anus 1 coccygeal nerve that originates in the spinal cord and emerges at the level of the tail bone (coccyx).

The C1-C7 nerve roots emerge above their respective vertebrae; the C8 nerve root emerges between the C7 and T1 vertebrae, while the remaining nerve roots emerge below their respective vertebrae.

It is known that an anesthetic injected in the proximity of a DRG and the dorsal nerve root results in complete loss of all sensations, including pain, in the dermatomal distribution of that DRG and nerve root. It also is known that analgesics are effective in relieving pain, but need to be administered systemically, with all the associated adverse events due to their effect on multiple organ systems. Injecting an anesthetic near the DRG would be impractical and expensive because it will require special expertise, is invasive needing an insertion of a guided needle or catheter, and may need to be repeated several times a day. In addition, unlike an anesthetic, the local effect of an analgesic on a nerve has not been demonstrated, nor its uptake by the nerve root.

As evident from the above discussion, there is a need in the art for a simple, easy to administer, effective pain control technique that selectively blocks pain, and does not have systemic side effects, and does not induce dependency and addiction. Such a technique would not only provide relief to millions of patients, but also will be a welcome solution to the opioid epidemic crisis throughout the US and the World.

Throughout this description, including the foregoing description of related art, any and all publicly available documents described herein, including any and all U.S. patent published patent applications, are specifically incorporated by reference herein in their entirety. The foregoing description of related art is not intended in any way as an admission that any of the documents described therein, including pending U.S. patent applications, are prior art to the present disclosure. Moreover, the description herein of any disadvantages associated with the described products, methods, and/or apparatus, is not intended to limit the embodiments. Indeed, aspects of the embodiments may include certain features of the described products, methods, and/or apparatus without suffering from their described disadvantages.

SUMMARY OF THE EMBODIMENTS

An embodiment described herein includes a method of remotely controlling pain by paraspinal application of a composition including a small molecule analgesic to the skin overlying the dorsal branch of a Dorsal Root Ganglion (DRG), delivering the small molecule analgesic through the skin and to the DRG synopses and Dorsal Horn (DH) by perineural spread, and blocking nociceptive transmission, thereby providing only analgesia in the entire dermatomal distribution of that DRG. In accordance with the embodiment, any powerful analgesic can be non-invasively applied, repeatedly if necessary, to an area remote from the affected area of pain, but still deliver adequate pain control to the affected area, without any systemic side effects. The embodiments therefore provide an alternative to opioid administration and its associated drawbacks.

Both the foregoing general description and the following detailed description are exemplary and explanatory and are intended to provide further explanation of the embodiments as claimed. Other objects, advantages, and features will be readily apparent to those skilled in the art from the following detailed description of the embodiments.

DETAILED DESCRIPTION

Before the embodiments are described, it is understood that this invention is not limited to the particular methodology, protocols, cell lines, vectors, and reagents described, as these may vary. It also is to be understood that the terminology used herein is for the purpose of describing particular embodiments only, and is not intended to limit the scope of the present embodiments which will be limited only by the appended claims.

Terms and phrases used herein are defined as set forth below unless otherwise specified. Throughout this description, the singular forms "a," "an," and "the" include plural reference unless the context clearly dictates otherwise. Thus, for example, a reference to "a host cell" includes a plurality of such host cells, and a reference to "an antibody" is a reference to one or more antibodies and equivalents thereof known to those skilled in the art, and so forth.

Throughout this description, the expression "paraspinal application" denotes application of a drug to the skin area overlying the DRG, dorsal nerve root, posterior ramus of the DRG and its branches, meninges, disc and the spinal segment adjacent to that. The peripheral somatic sensory system in humans consists of 8 cervical, 12 Thoracic, 5 Lumbar and 5 Sacral nerve roots. The dorsal nerve roots carry the sensory fibers and the ventral nerve roots carry the motor nerve fibers, both join to form the peripheral nerve. The dorsal nerve root is the primary first order neuron that carries all sensations from the area of the body it innervates and this area is known as a dermatome.

The cell body of this first order neuron is located in a structure, the DRG, which is a collection of cell bodies serving the particular dermatome. The axon emerging from the cell body divides into two branches, distal and proximal. The proximal branch travels medially and ends up in the DH of the corresponding spinal segment and synapses with the second order neuron at various levels of the Rexeed's lamina of the spinal cord, depending on the type of sensation it is responsible for. The distal branch joins the ventral root to form the peripheral nerve. It divides into an anterior ramus and a posterior ramus. The posterior ramus travels dorsally and supplies the disc, fascia, ligaments, muscles and skin overlying that area. The anterior branch on the other hand has a long course and supplies all the structures innervated by that dermatome including the skin, fascia, and muscles.

Throughout this description, the term "analgesics" denotes a non-narcotic analgesic that can be administered by any route of administration resulting in the relief of pain. Suitable analgesics include, for example non-steroidal anti-inflammatory drugs (NSAIDs), cyclooxygenase-2 (Cox-2) inhibitors, calcitonin gene-related peptide (CGRP) inhibitors, salicylates, antimigrane agents, miscellaneous analgesics, and combinations thereof. Exemplary NSAID analgesics for use in the embodiments herein include, but are not limited to, one or more of the following: ibuprofen, naproxen, sulindac, ketoprofen, tolmetin, etodolac, fenoprofen, diclofenac, flurbiprofen, diclofenac and misoprostol, piroxicam, ketorolac, indomethacin, meloxicam, esomeprazole and naproxen, nabumetone, famotidine and combinations with ibuprofen, oxaprozin, mefenamic acid, diflunisal, and mixtures and combinations thereof. Exemplary Cox-2 inhibitors for use in the embodiments herein described include, but are not limited to, one or more of the following: amlodipine, celecoxib, valdecoxib, rofecoxib, and mixtures and combinations thereof, including combinations with other families of analgesics.

Exemplary CGRP inhibitors for use in the embodiments herein described include, but are not limited to, one or more of the following: erenumab, fremanezumab, galcanezumag, eptinezumab, and mixtures and combinations thereof, including combinations with other families of analgesics. Exemplary salicates for use in the embodiments herein described include, but are not limited to, one or more of the following: aspirin, salsalate, magnesium salicylate, choline salicylate, diflunisal, and mixtures and combinations thereof, including combinations with other families of analgesics. Exemplary antimigrane agents for use in the embodiments herein described include, but are not limited to, one or more of the following: sumatriptan, ergotamine, frovatriptan, almotriptan, rizatriptan, eletriptan, naratriptan, dihydroergotamine, zolmitriptan, and mixtures and combinations thereof, including combinations with other families of analgesics. Exemplary miscellaneous analgesics for use in the embodiments herein described include known analgesics as well as agents known to treat other disorders, but also effective in treating pain. Suitable miscellaneous analgesics include, but are not limited to, one or more of the following: acetaminophen, baclofen, gabapentin, pregabalin, ziconotide, and mixtures and combinations thereof, including combinations with other families of analgesics. In one embodiment, the analgesic is baclofen or ketorolac, and in another embodiment, the analgesic is ketorolac.

The analgesic and/or analgesic salt may be present at any suitable concentration. For instance, in some cases, the analgesic and/or analgesic salt may be present at a concentration of at least about 1%, at least about 2%, at least about 3%, at least about 4%, at least about 5%, at least about 6%, at least about 7%, at least about 7.5%, at least about 8%, at least about 9%, or at least about 10% by weight of the composition. If ketorolac is present, it may be used in its native form, and/or as one or more ketorolac salts, e.g., the sodium salt of ketorolac, the potassium salt of ketorolac, the lysine salt of ketorolac, the arginine salt of ketorolac, etc.

One aspect of the embodiments provides compositions for the topical delivery of substances such as pharmaceutical agents (e.g., drugs, biological compounds, etc.). The pharmaceutical agents may be applied to the skin of a subject, e.g. a human, to aid in treatment of medical conditions or diseases, and/or the symptoms associated thereof, and more specifically in treating pain. In some embodiments, the embodiments provide for the delivery of a minimum amount of pharmaceutical agent to provide effective levels of medication topically while limiting side effects. In some cases, the effective dosage of the pharmaceutical agent may be lower than the effective dosage of the pharmaceutical agent when taken orally.

Delivery of the compositions including the one or more analgesics through the skin of a patient can be accomplished by a variety of techniques. In some embodiments, a composition of the embodiments is administered to a subject using a delivery vehicle such as a cream, gel, liquid, lotion, spray, aerosol, or transdermal patch. In one set of embodiments, a composition of the embodiments may be applied or impregnated in a bandage or a patch applied to the skin of a subject. A "subject," as used herein, means a human or non-human animal. Examples of subjects include, but are not limited to, a mammal such as a dog, a cat, a horse, a donkey, a rabbit, a cow, a pig, a sheep, a goat, a rat (e.g., *Rattus norvegicus*), a mouse (e.g., *Mus musculus*), a guinea pig, a hamster, a primate (e.g., a monkey, a chimpanzee, a baboon, an ape, a gorilla, etc.), or the like. Such delivery vehicles may be applied to the skin of a subject, such as a human subject. Examples of delivery vehicles are discussed herein.

The delivery vehicle may promote transfer into the skin of an effective concentration of the nitric oxide donor and/or the analgesic, directly or indirectly. For instance, the delivery vehicle may include one or more penetrating agents, as further described herein. Those of ordinary skill in the art will know of systems and techniques for incorporating a nitric oxide donor and/or an analgesic within delivery vehicles such as a cream, gel, liquid, lotion, spray, aerosol, or transdermal patch. In some cases, the concentration of the nitric oxide donor, and/or an analgesic in the delivery vehicle can be reduced with the inclusion of a greater amount or concentration of penetrating agent, or increased to lengthen the beneficial effect. In one set of embodiments, the nitric oxide donor and/or an analgesic may be used in conjunction with an adjunct, such as theophylline (for example, at 10% weight by volume). Those skilled in the art, using the guidelines provided herein, will be capable of developing a suitable transdermal composition for paraspinal application of the analgesic(s) to the desired area.

Other materials may be present within the delivery vehicle, for example, buffers, preservatives, surfactants, etc. For instance, the cream may include one or more of water, mineral oil, glyceryl stereate, squalene, propylene glycol stearate, wheat germ oil, glyceryl stearate, isopropyl myristate, steryl stearate, polysorbate 60, propylene glycol, oleic acid, tocopherol acetate, collagen, sorbitan stearate, vitamin A and D, triethanolamine, methylparaben, aloe vera extract, imidazolidinyl urea, propylparaben, PND, and/or BHA.

In one embodiment, the composition including the one or more analgesics may include a stabilization polymer, propylene glycol, and a polysorbate surfactant. Non-limiting examples of stabilization polymers include xanthan gum, KELTROL® BT and/or KELTROL® RD; an example of a polysorbate surfactant is Polysorbate 20.

The composition, in another set of embodiments, may include a nitric oxide donor, a hostile biophysical environment, a stabilization polymer, propylene glycol, a polysorbate surfactant and an analgesic and/or analgesic salt. In still another set of embodiments, the composition includes a stabilization polymer, propylene glycol, a polysorbate surfactant, and an analgesic and/or analgesic salt. In another set of embodiments, at least about 80% by weight of the composition comprises water, at least one chloride salt, a stabilization polymer, propylene glycol, a polysorbate surfactant, and an analgesic and/or analgesic salt. A nitric oxide donor such as L-arginine, which may be useful, for example, to increase localized blood flow at the site of delivery, which in turn can enhance delivery of the pharmaceutical agent, e.g., locally or systemically. In some cases, the enhancement may occur by maintaining an appropriate concentration gradient at the site of delivery.

In another aspect, the embodiments are directed to the use of a composition in the preparation of a medicament for remote treatment of pain as discussed herein. In one set of embodiments, the composition for the medicament includes a nitric oxide donor, a hostile biophysical environment, a stabilization polymer, propylene glycol, a polysorbate surfactant, and an analgesic and/or analgesic salt. In another set of embodiments, at least about 80% by weight of the composition for the medicament comprises water, at least one chloride salt, a nitric oxide donor, a stabilization polymer, propylene glycol, a polysorbate surfactant, and an analgesic and/or analgesic salt.

The composition for the medicament, in yet another set of embodiments, includes water, sodium chloride, a nitric oxide donor, glyceryl stearate, cetyl alcohol, potassium chloride, squalane, a stabilization polymer, isopropyl myristate, oleic acid, propylene glycol, a polysorbate surfactant, and an analgesic and/or analgesic salt.

The composition for the medicament, in still another set of embodiments, includes each of the following compounds at concentrations of no more than ±20% of the stated concentrations: water at a concentration of about 20 to about 70% weight, sodium chloride at a concentration of about 5 to about 20% weight, a nitric oxide donor at a concentration of about 4 to about 15% weight, glyceryl stearate at a concentration of about 3 to about 10% weight, cetyl alcohol at a concentration of about 3 to about 10% weight, potassium chloride at a concentration of about 3 to about 8% weight, propylene glycol at a concentration of about 3 to about 8% weight, squalane at a concentration of about 2 to about 6% weight, a polysorbate surfactant at a concentration of about 2% by weight, and isopropyl myristate at a concentration of about 1% weight, oleic acid at a concentration of about 1% weight, a stabilization polymer at a concentration of about 0.8% weight, an analgesic and/or analgesic salt at a concentration of from about 1.0% to about 30%, or any value or range therebetween.

In one set of embodiments, the composition may be present as an emulsion. As known by those of ordinary skill in the art, an emulsion typically includes a first phase (e.g., a discontinuous phase) contained within a second fluid phase (e.g., a continuous phase). The analgesic may be present in either or both phases. In addition, other materials such as those described herein may be present in the same phase as the analgesic. The composition may also include other components, for instance, glyceryl stearate, cetyl alcohol, squalane, isopropyl myristate, and/or oleic acid, which may form part or all of the balance of the composition.

The composition, in another set of embodiments, may include a base cream such as those commonly used in hand and facial creams to which an analgesic and/or analgesic salt is added, optionally with additional skin-penetrating agents such as one or more of choline chloride, magnesium chloride, sodium chloride, capsaicin, oleoresin *capsicum*, and the like. In other embodiments, the vehicle for delivery of the analgesic may contain deep eutectic solvents or mixtures thereof. Eutectic solvents have been described in the pharmaceutical sciences as an alternative formulation able to enhance bioavailability of the active pharmaceutical ingredient (API). Nonetheless, these eutectic mixtures, even though presenting a depression in the melting point often remain solid. A deep eutectic solvent (DES) can be a room temperature liquid typically formed by mixing two solid compounds, such as a quaternary ammonium salt (QAS) (e.g. choline chloride) and a hydrogen bond donor (HBD) (e.g. urea or a carboxylic acid) at their eutectic composition. Exemplary DES include, but are not limited to, choline oleate, choline hexanoate, choline geranate, choline malonate (choline disodium malonate), and urea-choline. Very often, a range of room temperature liquids can also be obtained near the eutectic composition.

Water may be present at any suitable concentration, for instance, present at a concentration of at least about 20%, at least about 25%, at least about 30%, at least about 35%, at least about 40%, at least about 45%, or at least about 50% by weight of the composition.

Non-limiting examples of chloride salts include sodium, potassium chloride, calcium chloride, magnesium chloride, choline chloride, and the like. In some cases, more than one chloride salt may be present, for example, sodium chloride and potassium chloride. The chloride salt(s) may be present in any suitable concentration. For instance, the chloride salt(s) may be present at a concentration of at least about 1%, at least about 2%, at least about 3%, at least about 4%, at least about 5%, at least about 6%, at least about 7%, at least about 7.5%, at least about 8%, at least about 9%, at least about 10%, at least about 12%, at least about 15%, at least about 17%, or at least about 20% by weight of the composition.

As specific non-limiting examples, in some cases, glyceryl stearate may be used at a concentration of about 7% by weight of the composition. In certain cases, cetyl alcohol may be used at a concentration of about 7% by weight of the composition. In one set of embodiments, squalene may be used at a concentration of about 4% by weight of the composition. In some instances, potassium chloride may be used at a concentration of about 5% by weight of the composition. In one set of embodiments, isopropyl myristate may be used at a concentration of about 1% by weight of the composition. In some cases, oleic acid may be used at a concentration of about 1% by weight of the composition.

In accordance with the embodiments described herein, and not intending to be bound by any theory of operation, the inventor discovered that a small molecule drug applied to the skin in the paraspinal area of a dermatomal segment can gain access to the perineural space, and ultimately to the DRG cell bodies and even the DH synapses. It is believed that if a small molecule that penetrates the skin and gains access to the rich nerve plexusus and free nerve endings present in the dermis of the skin and the subcutaneous tissue, it will be taken up by the free nerve endings, gain access to the perineural space and travel along the dorsal branches and ultimately gain access to the DRG cell bodies and even the DH synapses. The inventor has unexpectedly discovered by direct and indirect evidence that this process happens at least in some nerves. Accordingly, a drug applied in the manner described above, once it penetrates the skin and enters deep tissue, will penetrate all the way down to the spine and paraspinal area via perineural spread, and will bathe the DRG, dorsal root and spine.

In accordance with the embodiments, once the analgesic reaches the DRG and the synapse between the first order neuron and the second order neuron in the DH, it may block the transmission of nociceptive stimuli across the synapse, thus providing pain relief for the entire dermatomal area. Such an application and transmission provides only pain relief, and unlike anesthetics, other sensations will not be affected.

Figure 3:
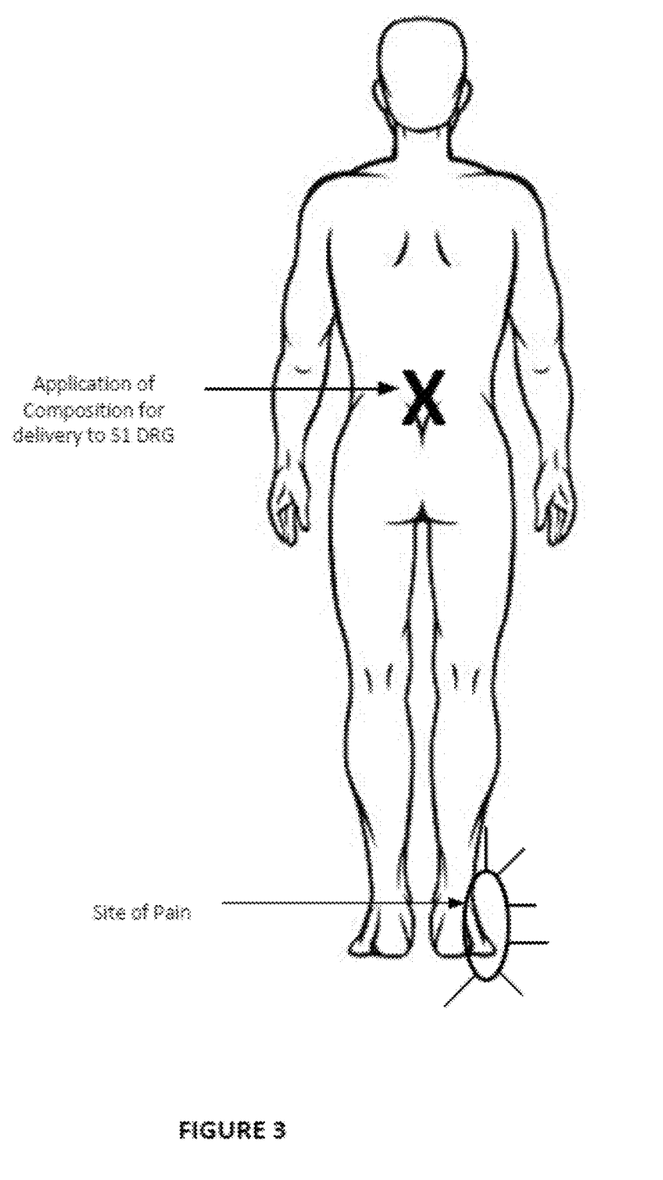
FIG. 3 illustrates an exemplary embodiment described herein.
Figure 4:
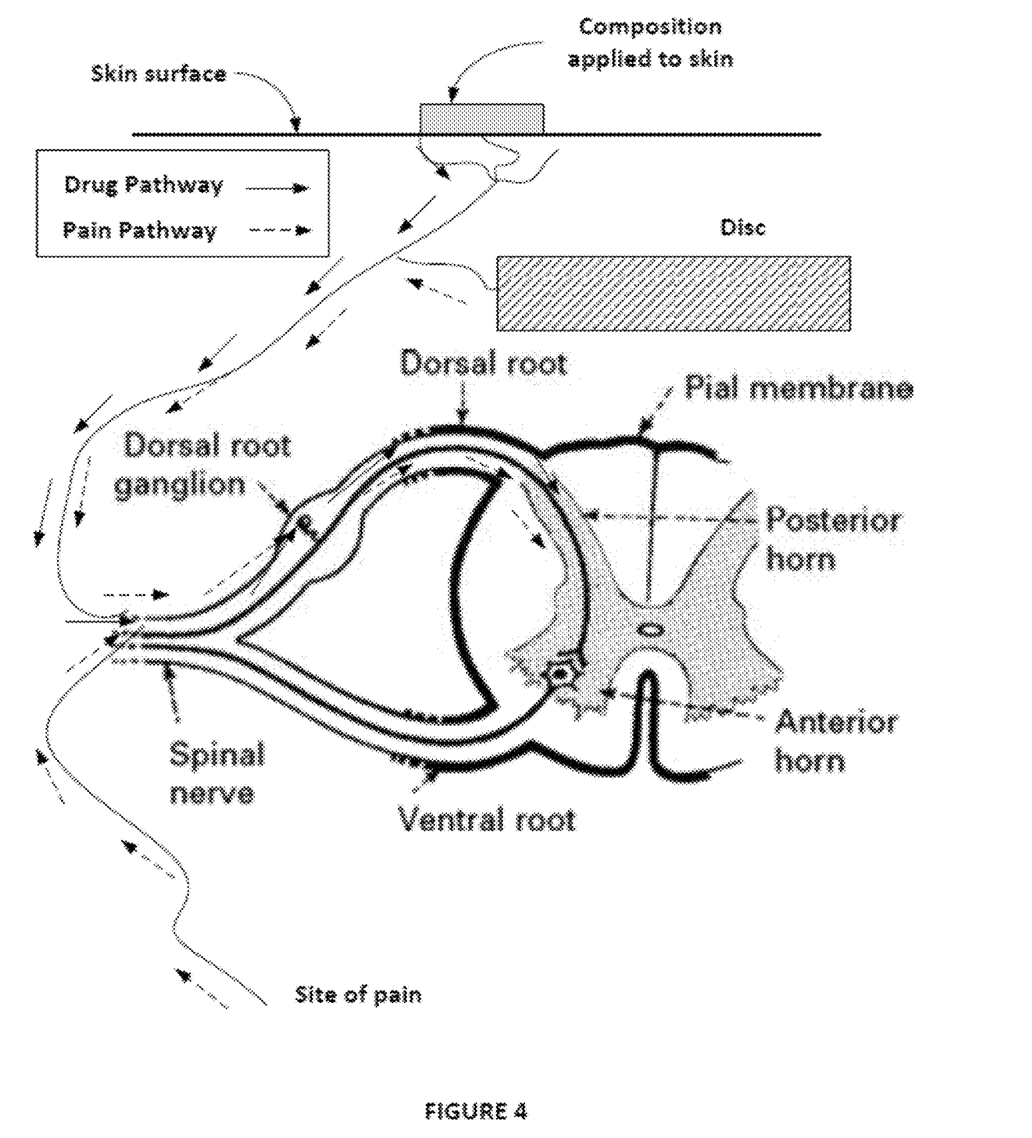
FIG. 4 illustrates an exemplary embodiment described herein.

An illustration of the remote control of pain in accordance with one or more embodiments described herein is shown in FIGS. 3 and 4. In the embodiment shown in FIG. 3, the patient is suffering pain in the outer (or lateral) portion of the ankle and foot. The pain could be the result of an injury, surgery, or any other source of pain. FIG. 4 illustrates the directions in which the pain travels throughout the nervous system, from the site of pain, to the DRG and dorsal horn, as well as from the spinal disc, if applicable. The direction the pain travels is denoted by a dotted line in FIG. 4. In accordance with an embodiment, the patient can self-administer (or by assistance from another person) by paraspinal application a composition in the area marked by the large X, overlying the dermatomal segment that permits access to the perineural space to the DRG responsible for the situs of injury (in this case, the DRG at S1). As seen in FIG. 4, the composition applied to the surface of the skin permits the analgesic and/or salt thereof to penetrate the skin and access the nerve endings, and the drug will travel along the perineural space to the DRG via perineural spread and on to the dorsal horn (DH). The direction the drug travels is denoted by a solid line in FIG. 4. By applying the composition in this manner, the analgesic and/or analgesic salt will access the perineural space, access the S1 DRG via perineural spread, and suppress only the pain in the corresponding area. As will be appreciated by those skilled the art, the composition can be applied numerous times a day, or could be in the form of a patch designed for timed and delayed release of the analgesic and/or analgesic salt.

Thus the embodiments described herein may provide an attractive, simple to administer, inexpensive method of administering already available effective analgesics, without associated systemic side effects or contaminating the local affected area with external applications. This method utilizes a novel, counter-intuitive, unexpected route of administration of already available, very effective drugs minus their systemic side effects. This would potentially address and help solve the opioid crisis in the country.

The following examples are provided to illustrate the present embodiments. The examples include six prophetic examples followed by two real examples demonstrating the dramatic and unexpected effects of the embodiments described herein. It should be understood, however, that the embodiments are not to be limited to the specific conditions or details described in these examples. Throughout the specification, any and all references to a publicly available document, including a U.S. patent, are specifically incorporated by reference.

Example One

These studies in rats will demonstrate that Ketorolac, a NSAID, applied remotely to the L3-L5 Paraspinal area of the rat's back will give relief to pain produced by injuring the hind paw. Rats will be placed on a standardized, validated platform and their baseline activity (number of steps) and pressure they exert on each of the limbs. Then an inflammatory agent will be injected to one of the foot pad and again activity and pressure levels are measured. Then ketorolac or placebo cream is applied to the L3-L5 paraspinal area and again activity and pressure levels are measured to demonstrate the therapeutic efficacy compared to placebo, of the Ketorolac cream.

The same animal model can also be extended to demonstrate longer lasting and better efficacy of ketorolac cream compared to systemic a opioid administered systemically.

Example Two: Animal Data

These studies will also be done in rats. Ketorolac (or Ketorolac salt-containing) cream and systemic injectable ketorolac will be administered to two different set of rats, and serum Ketorolac concentrations will be measured to demonstrate that Ketorolac cream applied to the skin does not result in significant serum concentration of the drug, thus demonstrating the lack of systemic exposure Example Three: Human This is an example of human clinical use of the embodiments. Following a surgical procedure (eg Caesarian Section), the conventional method of post-operative pain control is to administer parenteral opioid during the hospital stay, and then oral opioids at home for 7-10 days. With these embodiments, instead, a Ketorolac (or Ketorolac salt-containing) cream is applied to the T10-T12 paraspinal area (the dermatomes covering the surgical incision). The cream is applied as frequently as needed. This provides much longer and consistent pain relief than present standard of care, is much easier to use at home and also avoids or greatly reduces the amount of opioids needed for post-operative pain control. It also allows the patient to be discharged earlier from hospital, as it avoids the constipation produced by the opioids. The side effects like sedation, drowsiness and nausea associated with opioids also are avoided.

Example Four: Human

A patient suffers from a disc rupture and severe back pain due to irritation of the adjacent nerve root, or the nerve innervating that disc. Patient is not a surgical candidate due to size of that disc protrusion or contraindicating medical condition or is unwilling to have surgery. The present conventional options for treatment include: (a) nerve block, an invasive and expensive procedure with temporary relief; (b). epidural steroid injection, also an invasive and expensive procedure with limited and temporary relief; and/or (c) chronic opioid therapy with all the problems of addiction, dependence and diversion. With these embodiments a ketorolac (or other potent analgesic and/or salts thereof) cream can be applied over the same dermatomal distribution of the innervation of the disc, allowing the drug to reach the DRG and DH of the affected nerve serving that disc, relieving the pain by a non-invasive, inexpensive and easy to use method.

Example Five: Human

A patient suffers from extensive crush injury with open wound and potential for bleed in the left ankle and foot. The open wound is sutured. But severe pain persists. The present conventional treatment would be opioid tablets. But use of opioids for the length of time it takes to heal (weeks) poses a clear danger of dependence and addiction (the likely hood of addiction increase incrementally with the use of opioid for more than a week). Injectable ketorolac also can provide significant relief, but it can not be used for more than 5 days due to systemic toxicity. A NSAID or analgesic cannot be applied locally over the injury site because of risk of infecting the sutured area, bleeding at the local site and delayed wound healing. As illustrated in part in FIG. 3, the embodiments offer a safe, non-invasive alternative. Ketorolac (or Ketorolac salt-containing) cream can be applied to skin over the L5-S1 DRG and nerve root area, (marked with an "X" in FIG. 3), away from the injured site and provide pain relief equal to or better than opioids, without any systemic side effects, any harm to injured site, and without concerns about addiction. The cream can be repeatedly applied as frequently as needed and as long as needed without any major concerns.

Example Six: Human

A patient suffers from severe arthritic pain localized to one or a few adjoining joints, eg Gout, with severe distress and loss of mobility. Conventional treatments include treatment of underlying cause and opioids. Local application of NSAIDs over the joint can interfere with the treatment of the underlying cause. The embodiments permit the use of an analgesic cream to be applied far away from the joint, over the DRG innervating that or those joints, and still provide adequate and long lasting relief.

Example 7: Animal

Twelve Sprague-Dawley male rats (300 g) were injected in their left paw with an inflammatory agent, Freund's Complete Adjuvant (FCA), that caused their feet to swell and be painful, a method known to evoke nociceptive pain in rats. See, e.g., Larson, et al., "The Study of Pain in Rats and Mice," *Comparative Medicine*, Vol. 69, No. 6, pp. 555-570 (2019). Four of the 12 rats were treated with a placebo cream, 4 rats were treated with a 2.5% ketorolac cream, and 4 rats were treated with a 5.0% ketorolac cream. The cream was a deep eutectic solvent cream. The control and ketorolac creams were applied to the shaved-skin of the rate over L5/L6, with is the location of the dorsal root ganglia that connects to the foot.

All rats were tested in a device that gradually increased pressure on the feet. The rat's paw is positioned on a resting place and above the rat's paw is placed a flat metal plate that rests on top of the rat's paw. The device then gradually increases the downward force of the metal plate, displaying the force exerted in pressure units. At the point where the rat could no longer take the pain caused by the pressure the rat would withdraw its foot from the device, the device would stop increasing pressure and the pressure unit at that point is determined. Pressure was applied by the device at 30, 60, 120, and 240 minutes following application of the control and ketorolac creams.

To assess the efficacy of the control and ketorolac creams, a sum of pain intensity difference (SPID) was calculated. The results are provided in the Table below, where the values are reported in pressure units:

| Cream applied | Time Interval | | | |
| --- | --- | --- | --- | --- |
| | 30 min | 60 min | 120 min | 240 min |
| Placebo | 0.6 | 2.7 | 0.5 | −0.5 |
| Low Dose (2.5%) | 2.7 | 4.8 | 2.4 | 3.2 |
| High Dose (5.0%) | 9.9 | 7.5 | 8.2 | 6.4 |

Values in pressure units, representing the average value of the 4 rats treated.

The SPID4 of the above applications were calculated. The animals receiving the placebo had a SPID of −1.06 pressure units, which means their pain slightly increased. In contrast, the animals receiving the ketorolac cream had a SPID of 21.37 pressure units, indicating nearly complete pain relief.

Example 8: Human

A 77 year old male was diagnosed with a fracture of L1 in his spine. He suffered severe pain in his right groin and right upper leg. He applied a 2.5% ketorolac cream to the site of the pain without noticeable relief. He then applied the same cream to the skin over the L1 fracture and received substantial relief of the pain in less than 10 minutes.

What is claimed is:

1. A method of remotely controlling pain in an affected dermatomal area comprising:
topically applying via paraspinal application a composition comprising ketorolac or salt thereof to the skin overlying the dorsal branch of a Dorsal Root Ganglion (DRG) serving the affected dermatomal area, the affected dermatomal area being present in an area of the body remote from the area of the skin to which the composition is applied, the composition comprising: (i) an effective dosage of ketorolac or salt thereof as the sole active agent in an amount of from about 1% to about 10% by weight of the composition; (ii) at least one skin-penetrating agent selected from the group consisting of choline chloride, magnesium chloride, sodium chloride, capsaicin, oleoresin, capsicum, and mixtures thereof; and (iii) one or more additional agents selected from the group consisting of a nitric oxide donor, buffers, preservatives, surfactants, water, mineral oil, squalene, propylene glycol stearate, wheat germ oil, glyceryl stearate, isopropyl myristate, stearyl stearate, polysorbate 60, polysorbate surfactants, propylene glycol, oleic acid, tocopherol acetate, collagen, sorbitan stearate, vitamin A and D, triethanolamine, methylparaben, aloe vera extract, imidazolidinyl urea, propylparaben, beta hydroxy acid (BHA), cetyl alcohol, stabilization polymers, potassium chloride, and mixtures thereof.

non-systemically delivering the ketorolac or salt thereof through the skin to the perineural space, and along the dorsal branches to the DRG and Dorsal Horn (DH); and blocking nociceptive transmission to the affected dermatomal area.

2. The method of claim 1, wherein the composition is a transdermal composition in a form selected from the group consisting of cream, gel, liquid, lotion, spray, aerosol, and transdermal patch.

3. The method of claim 2, wherein the composition is in the form of a cream, gel, liquid, or lotion.

4. The method of claim 3, wherein the composition is a cream.

5. The method of claim 1, wherein the composition comprises a nitric oxide donor, a stabilization polymer, propylene glycol, a polysorbate surfactant, and ketorolac as the sole active agent.

6. The method of claim 1, wherein the composition comprises water, sodium chloride, a nitric oxide donor, glyceryl stearate, cetyl alcohol, potassium chloride, squalane, a stabilization polymer, isopropyl myristate, oleic acid, propylene glycol, a polysorbate surfactant, and ketorolac as the sole active agent.

* * * * *